Sept. 3, 1935.                E. W. WORK                2,013,372
                              RELIEF VALVE
                          Filed Aug. 31, 1933
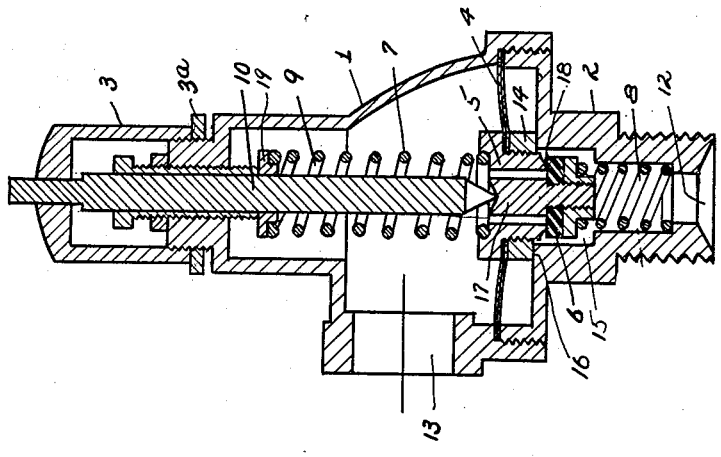
INVENTOR
ERNEST WILLY WORK
by [signature]
   Attorney Patented Sept. 3, 1935

2,013,372

UNITED STATES PATENT OFFICE 2,013,372

RELIEF VALVE

Ernest Willy Work, Toronto, Ontario, Canada

Application August 31, 1933, Serial No. 687,723
In Canada March 10, 1933

2 Claims. (Cl. 137—53)

This invention relates to a relief valve for pressure systems and has for one of its objects the provision of a valve which will be simple in construction and positive in its action.

Valves are provided on pressure systems to release the pressure when it rises above a predetermined maximum and heretofore it has been customary to maintain the valve disc on the valve seat by means of a spring adjusted to the proper tension which acts directly on the valve disc and adjusted to maintain the valve disc on the valve seat so that it will not be moved therefrom until the internal pressure of the pressure system rises above the predetermined maximum. Heretofore such valves have been constructed so that the force of the spring presses the valve disc against the valve seat and if there is no pressure in the system, the full tension of the spring will rest on the valve disc and if this condition exists for any length of time (as for example on heating systems in the summer) the pressure of the spring may vulcanize the disc to the seat preventing the valve to open at the pressure for which it is set; for example, a ½" standard diaphragm valve having a diaphragm with a surface area of 2 square inches and set to release at 30 lbs. is loaded with a spring tension of 120 lbs. In case of no pressure in the system, the full 60 lbs. press down on the valve disc which load will cause an adhesion of the valve to the seat, this being the main reason for valves sticking. One of the objects of my invention is to provide a valve which will overcome this difficulty.

Other and further objects and advantages of my invention will be apparent by reference to the following description and the accompanying drawing in which:—

The single figure is a vertical sectional view of a preferred construction.

Like characters of reference refer to like parts throughout the specification and drawing.

The relief valve illustrated in the drawing comprises a housing consisting of a main body 1, a base 2, an adjustable cap 3, an inlet port 12 and a discharge port 13 and having within the body a flexible diaphragm 4 responsive to pressure variations within the body, an orifice through said diaphragm and a valve structure manually closing said orifice consisting of a valve seat 5, a valve disc 6, a compression spring 7 acting on the diaphragm against the pressure within the body and resisting its movement, a disc spring 8, a pressure adjusting screw 9 and an adjustable movable stop 10 which arrests the movement of the valve disc when the pressure rises above a predetermined maximum.

The valve seat 5 is mounted on the flexible diaphragm 4 and secured thereto by means of a locknut 14, the diaphragm being held in fixed position within the body 1 in any approved manner, such as between the abutting surfaces of the body 1 and the base 2 as illustrated in the drawing. The base is formed with a well 15 which is provided at its upper edge with a shoulder 16 to support the diaphragm when there is little or no pressure within the system, thereby preventing distortion of the diaphragm under the load of the spring 7. The valve disc 6 is located within the well 15 and supported from the base by means of a spring 8 and engages with the lip 18 of the valve seat when it is in closed position, the spring 8 preventing the valve disc from falling away from the seat when the internal pressure has fallen to a very low level and also permitting of the valve disc being manually moved out of engagement therewith, the valve disc being guided by guiding member 17. Variations of the pressure within the system will impart movement to the flexible diaphragm, the valve seat and valve disc moving therewith. The stop 10 being designed to engage with the top of the disc guide and the cap 3, the distance piece being formed with the shoulder 11 which engages with the cap 3, when the predetermined pressure is reached the cap being locked in its set position by the lock nut 3a. The valve may be adjusted to open at different pressure by increasing or diminishing the distance between the cap and the shoulder 11, this being achieved by means of the adjustable screw cap 30. The pressure of the compression spring 7 acting on the diaphragm may be adjusted by the compression screw 9 which is screw threaded through the head of the main body. The compression screw 7 and the washer 19 are each formed with a bore therethrough to permit of the entry of the distance piece 10 into the main body to engage with the disc guide 17.

The device illustrated in the drawing shows the valve in closed position, the valve being adjusted to open when the pressure within the system has risen above a predetermined maximum. To determine whether valve is in proper working condition either mechanical or manual force is exerted on the stop 10 to force it downwardly. This moves the valve disc out of engagement with the lip 18 allowing the fluid in the system to escape. As soon as the force is released from the easing pin the disc will be returned to its closed position by the pressure within the system. The variations of the pressure in the system act on the flexible diaphragm imparting movement to the flexible diaphragm, the valve seat and the valve disc. When the predetermined maximum pressure is reached the shoulder 11 will come into engagement with the cap 3 preventing any further movement of the stop 10 whereupon the movement of the valve disc is arrested, and as the pressure increases above this point, the diaphragm will continue its movement thereby separating the valve seat from the valve disc, permitting the excess pressure to escape.

While I have described the preferred construction of a valve embodying my invention it will be apparent that many variations may be made without departing from the scope of my invention, all of which I claim in the appended claims.

Having thus fully described my invention what I claim as new and desire to secure by Letters Patent is:

1. A relief valve for pressure systems comprising a hollow body having an inlet opening for communication with the system and also having a discharge opening, a flexible diaphragm within the housing between said openings responsive to pressure variations within the system, a valve seat mounted on the diaphragm, a spring acting on the diaphragm against the pressure within the system, a sleeve threaded through the body, an abutment member for the spring abuttingly engaged by one end of said sleeve, said sleeve being adjustable to vary the pressure exerted by said spring, acting against the pressure within the system, a valve disk for the valve seat normally held closed by the pressure within the system, a stop member freely slidable within the body and extending through said sleeve, said stop member being separate from but abuttingly engageable by the valve for unseating the same when the pressure within the system exceeds a predetermined maximum, and a cap screwed upon the body and formed with an opening, said slidable stop having a reduced extension passing through said opening and projecting beyond the cap for manual actuation to move the valve disk away from the valve seat for the purpose of testing the functioning of the valve.

2. A relief valve for pressure systems comprising a hollow body having an inlet opening for communication with the system and also having a discharge opening, a flexible diaphragm within the housing between said openings responsive to pressure variations within the system, a valve seat mounted on the diaphragm, a spring acting on the diaphragm against the pressure within the system, an adjustable abutment member within the body reacting against said spring for varying the pressure exerted thereby against the pressure within the system, a valve disk for the valve seat held normally closed by the pressure within the system, a stop member longitudinally slidable within the body, said stop member being separate from but abuttingly engageable by the valve for unseating the same when the pressure within the system exceeds a predetermined maximum, and a cap screwed upon the body and independent of and spaced from said abutment member, said cap having an opening therein, and said stop member having a reduced extension projecting through said opening and beyond the cap for manual actuation to unseat said valve for the purpose of testing the functioning of the valve, said reduced extension defining a shoulder cooperating with the cap for limiting the sliding movement of the stop member.

E. W. WORK.